United States Patent
Linzer

(10) Patent No.: US 10,628,921 B1
(45) Date of Patent: Apr. 21, 2020

(54) TONE BASED NON-SMOOTH DETECTION

(71) Applicant: Ambarella International LP, Santa Clara, CA (US)

(72) Inventor: Elliot N. Linzer, Bergenfield, NY (US)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 15/465,190

(22) Filed: Mar. 21, 2017

(51) Int. Cl.
  *G06T 5/00* (2006.01)
  *G06T 7/90* (2017.01)
  *G06T 7/44* (2017.01)
  *H04N 5/357* (2011.01)

(52) U.S. Cl.
  CPC ............... *G06T 5/002* (2013.01); *G06T 7/44* (2017.01); *G06T 7/90* (2017.01); *H04N 5/357* (2013.01); *G06T 2207/10004* (2013.01); *G06T 2207/20012* (2013.01); *G06T 2207/20182* (2013.01)

(58) Field of Classification Search
  None
  See application file for complete search history.

(56) References Cited

U.S. PATENT DOCUMENTS

| | | | |
|---|---|---|---|
| 6,603,878 B1 * | 8/2003 | Takemoto | G06T 5/004 358/520 |
| 6,856,704 B1 * | 2/2005 | Gallagher | G06T 5/20 345/597 |
| 9,508,156 B1 * | 11/2016 | Linzer | G06T 7/223 |
| 10,264,265 B1 * | 4/2019 | Brailovskiy | H04N 19/136 |
| 2005/0001913 A1 * | 1/2005 | Hoshuyama | G06T 5/20 348/272 |
| 2008/0292202 A1 * | 11/2008 | Vakrat | G06T 5/009 382/261 |
| 2009/0141149 A1 * | 6/2009 | Zhang | G06T 5/009 348/241 |
| 2009/0309998 A1 * | 12/2009 | Grosvenor | G06T 5/40 348/241 |
| 2017/0070745 A1 * | 3/2017 | Lee | H04N 19/513 |

* cited by examiner

*Primary Examiner* — Kim Y Vu
*Assistant Examiner* — Nathan J Bloom
(74) *Attorney, Agent, or Firm* — Christopher P. Maiorana, PC

(57) ABSTRACT

A method of noise filtering an image is presented. The method includes the steps of (A) computing a non-smooth amount for at least one area of the image, (B) computing a tone value for the at least one area of the image, (C) computing an adjusted non-smooth amount for the at least one area by adjusting the non-smooth amount for the at least one area of the image based on the tone value for the at least one area of the image, and (D) performing one or more image processing steps on the at least one area of the image based on the adjusted non-smooth amount.

18 Claims, 7 Drawing Sheets

TONE BASED NON-SMOOTH DETECTION

FIELD OF THE INVENTION

The invention relates to digital image processing generally and, more particularly, to a method and/or apparatus for implementing a tone based non-smooth detection.

BACKGROUND

When a digital image sensor measures light at individual locations or picture elements (pixels), the measurements are not exact but rather include noise. Picture noise can degrade the subjective quality of a digital picture. Typically, digital image capture devices (e.g., cameras) incorporate some form of image processing to reduce picture noise.

Conventional picture noise reduction techniques all have drawbacks. Fundamentally, the "true" (noise free) pixel value is impossible to determine exactly. Thus, any method that changes the pixel values of a digital picture to reduce noise will also distort the picture in other ways. Consequently, the noise reduction method itself can degrade the subjective quality of the digital picture.

Sharpening can improve the subjective quality of a picture. However, in some cases or some areas of a picture, sharpening, or sharpening too much, can degrade the subjective quality. For example, sharpening noise increases the perception of the noise and, therefore, can degrade the subjective quality. Typically, noise is more visible and objectionable on smooth, flat, areas. Thus, using more noise reduction and/or less sharpening in smooth areas, as opposed to non-smooth areas, is generally desirable.

It would be desirable to implement a tone based non-smooth detection.

SUMMARY

The invention concerns a method of noise filtering an image including the steps of (A) computing a non-smooth amount for at least one area of the image, (B) computing a tone value for the at least one area of the image, (C) computing an adjusted non-smooth amount for the at least one area by adjusting the non-smooth amount for the at least one area of the image based on the tone value for the at least one area of the image, and (D) performing one or more image processing steps on the at least one area of the image based on the adjusted non-smooth amount.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a tone based non-smooth detection that may (i) provide noise correction based upon expected noise associated with different tones, (ii) increase chance of getting noise correction correct, (iii) adjust noise correction based on model of expected noise, (iv) adjust noise correction based on local pixel values, (v) provide a non-smooth detector with improved ability to distinguish between smooth picture noisy areas and non-smooth clean areas, (vi) reuse hardware over multiple passes, (vii) use a lookup table to adjust non-smoothness values based on tone values, and/or (vii) be implemented as one or more integrated circuits.

Figure 1:
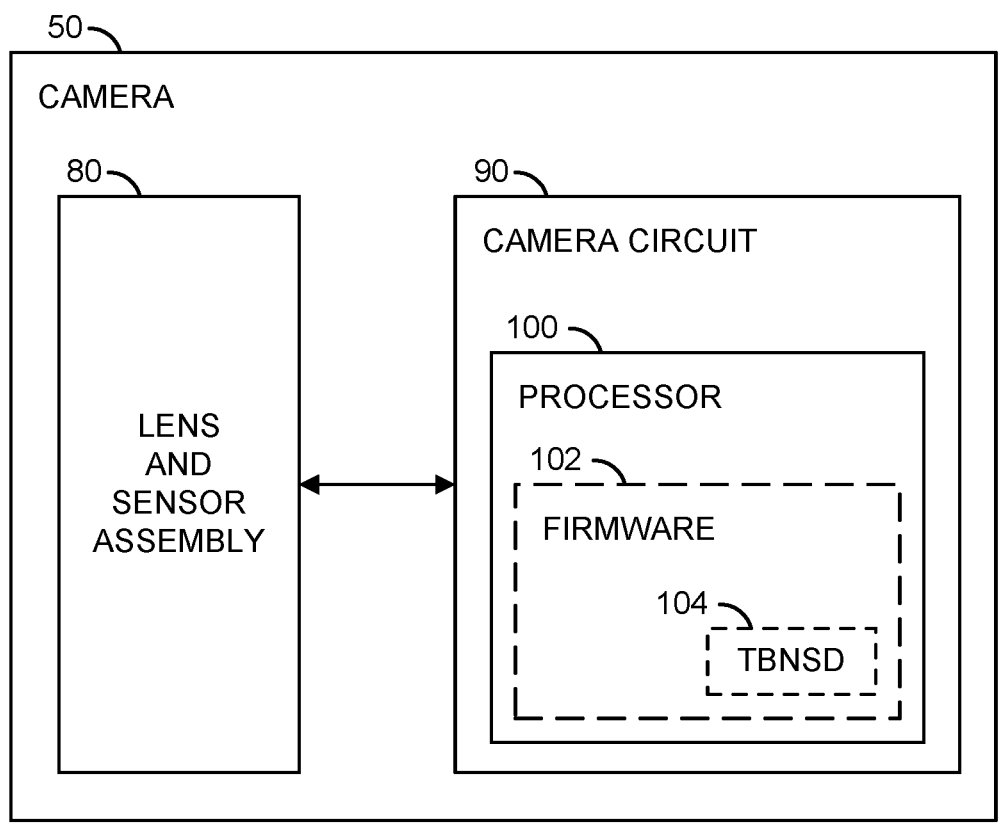
FIG. 1 is a block diagram illustrating an example implementation of tone based non-smooth detection in accordance with an embodiment of the invention in the context of a camera.

Referring to FIG. 1, a block diagram illustrating an embodiment of the invention in the context of a camera 50 is shown. The camera 50 may comprise a block (or circuit) 80 and/or a block (or circuit) 90. The circuit 80 may be a lens and image sensor assembly. The circuit 90 may be a camera circuit. In some embodiments, the camera circuit 90 may comprise one or more circuits configured to implement a digital video camera, a digital still camera or a hybrid digital video/still camera, collectively and individually referred to as digital cameras. In an example, the electronics of the camera circuit 90 may be implemented as one or more integrated circuits. For example, an application specific integrated circuit (ASIC) or system-on-a-chip (SoC) may be used to implement a processing portion of the camera circuit 90. The camera 50 may comprise other components (not shown). The number, type and/or function of the components of the camera 50 may be varied according to the design criteria of a particular implementation.

The camera circuit 90 may comprise a block (or circuit) 100. The circuit 100 may implement a processor. The processor 100 may be implemented as an embedded processor (e.g., ARM, etc.). In some embodiments, the processor 100 may comprise a number of hardware blocks (or units) configured for measuring non-smoothness and tone values for an image, adjusting the non-smoothness values for expected noise levels based on the tone values, and controlling one or more image processing operations (e.g., noise reduction, sharpening, etc.) performed on the image based on the adjusted non-smoothness values. In some embodiments, the processor 100 may comprise a block (or circuit) 102. The circuit 102 may be implemented as embodying either software or firmware. The software or firmware 102 may comprise a portion (or code or routine) 104. The portion 104 may implement rules.

In an example, the rules 104 may implement tone based non-smooth detection (TBNSD) in accordance with an embodiment of the invention. The rules 104 may be configured to implement control logic to adjust (e.g., increase and/or decrease) measured non-smoothness values based upon measured tone values. The adjusted non-smoothness values may be used by the rules 104 to control one or more image processing operations (e.g., noise filtering, noise reduction, noise correction, sharpening, etc.). Each of the camera circuit 90, the processor 100, the firmware 102 and/or the rules 104 may comprise other components (not shown). The number, type and/or functions of the components of the camera circuit 90, the processor 100, the firmware 102 and/or the rules 104 may be varied according to the design criteria of a particular implementation.

Figure 2:
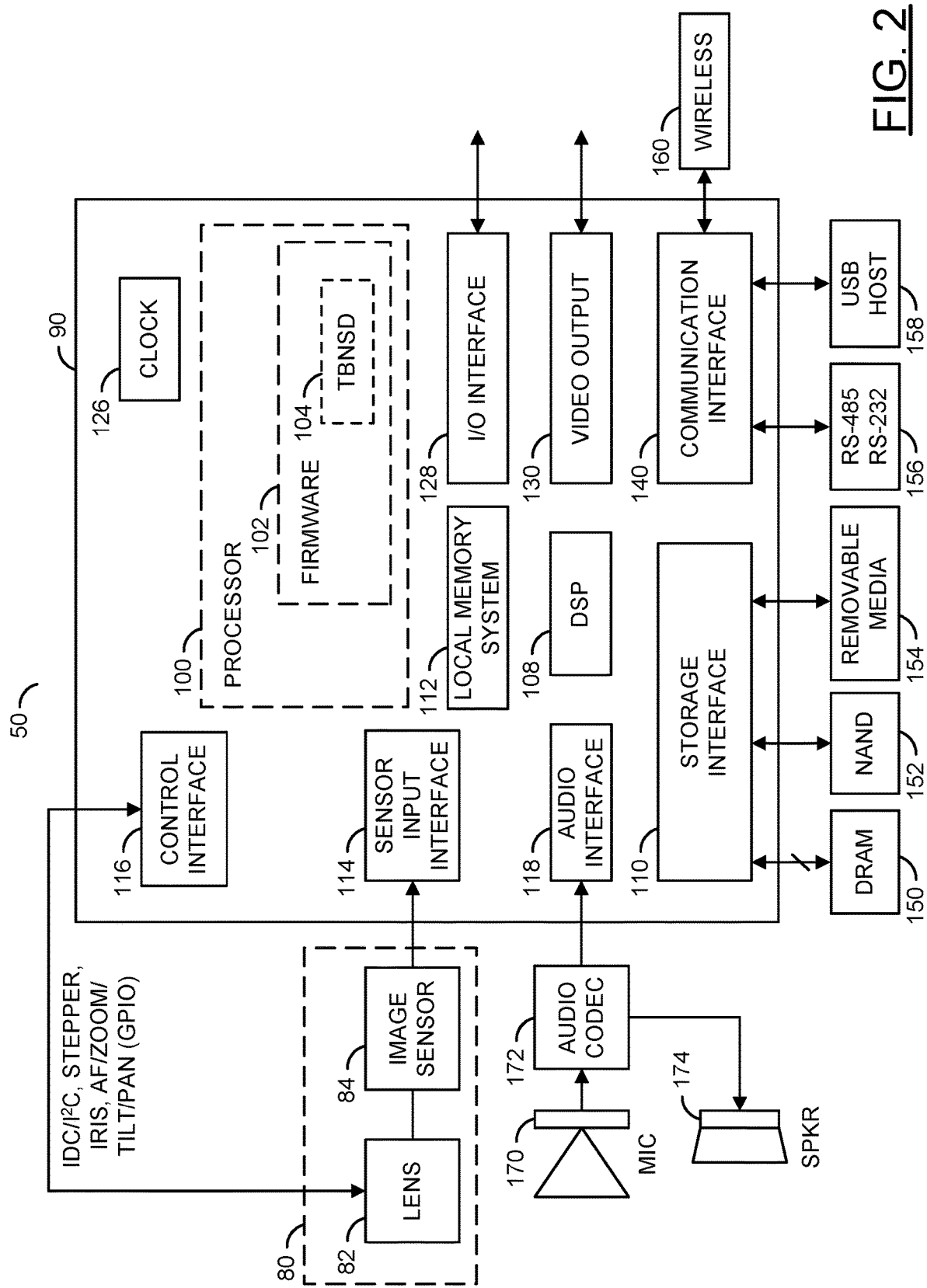
FIG. 2 is a diagram illustrating a camera system incorporating tone based non-smooth detection in accordance with an embodiment of the invention.

Referring to FIG. 2, a block diagram of the camera circuit 90 is shown illustrating an example implementation of a camera/recorder system (or apparatus). The lens and sensor assembly 80 is shown connected to the camera circuit 90. In some embodiments, the lens and sensor assembly 80 may be a component of the camera circuit 90 (e.g., a SoC component). In some embodiments, the lens and sensor assembly 80 may be a separate component from the camera circuit 90 (e.g., the lens and sensor assembly may be an interchangeable component compatible with the camera circuit 90). In some embodiments, the lens and sensor assembly 80 may be part of a separate camera connected to the processing portion of the circuit 90 (e.g., via a video cable, a high definition media interface (HDMI) cable, a universal serial bus (USB) cable, an Ethernet cable, or wireless link).

The lens and sensor assembly 80 may comprise a block (or circuit) 82 and/or a block (or circuit) 84. The circuit 82 may be associated with a lens. The circuit 84 may be an image sensor. The lens and sensor assembly 80 may comprise other components (not shown). The number, type and/or function of the components of the lens and sensor assembly 80 may be varied according to the design criteria of a particular implementation.

The lens 82 may capture and/or focus light input received from the environment near the camera 50. The lens 82 may capture and/or focus light for the image sensor 84. The lens 82 may be implemented as an optical lens. The lens 80 may provide a zooming feature and/or a focusing feature. The lens 82 may be implemented with additional circuitry (e.g., motors) to adjust a direction, zoom and/or aperture of the lens 82. The lens 82 may be directed, tilted, panned, zoomed and/or rotated to provide a targeted view of the environment near the camera 50.

The image sensor 84 may receive light from the lens 82. The image sensor 84 may be configured to transform the received focused light into digital data (e.g., bitstreams). In some embodiments, the image sensor 84 may perform an analog to digital conversion. For example, the image sensor 84 may perform a photoelectric conversion of the focused light received from the lens 82. The image sensor 84 may present converted image data as a color filter array (CFA) formatted bitstream. The processor 100 may transform the bitstream into video data, video files and/or video frames (e.g., human-legible content).

In various embodiments, the camera circuit 90 may comprise the processor 100, a block (or circuit) 108, a block (or circuit) 110, a block (or circuit) 112, a block (or circuit) 114, a block (or circuit) 116, a block (or circuit) 118, a block (or circuit) 126, a block (or circuit) 128, a block (or circuit) 130 and/or a block (or circuit) 140. The circuit 108 may be a digital signal processing (DSP) module. In some embodiments, the circuit 108 may implement separate image DSP and video DSP modules. The circuit 110 may be a storage interface. The circuit 112 may implement a local memory system (e.g., cache, fast random access memory, etc.). The circuit 114 may implement a sensor input (or interface). The circuit 116 may implement one or more control interfaces including but not limited to an inter device communication (IDC) interface, an inter integrated circuit ($I^2C$) interface, a serial peripheral interface (SPI), and a pulse width modulation (PWM) interface. The circuit 118 may implement an audio interface (e.g., an $I^2S$ interface, etc.). The circuit 126 may implement a clock circuit including but not limited to a real time clock (RTC), a watchdog timer (WDT), and/or one or more programmable timers. The circuit 128 may implement an input/output (I/O) interface. The circuit 130 may be a video output module. The circuit 140 may be a communication module. The circuits 100 through 140 may be connected to each other using one or more buses, traces, protocols, etc.

The camera circuit 90 is shown connected to a block (or circuit) 150, a block (or circuit) 152, a block (or circuit) 154, a block (or circuit) 156, a block (or circuit) 158, a block (or circuit) 160, a block (or circuit) 170, a block (or circuit) 172 and/or a block (or circuit) 174. The circuit 150 may be a dynamic random access memory (DRAM). The circuit 152 may be a nonvolatile memory (e.g., NAND flash memory, NOR flash memory, etc.). The circuit 154 may be an interface for connecting to removable media (e.g., secure digital media (SD), secure digital extended capacity media (SDXC), etc.). The circuit 156 may be one or more serial interfaces (e.g., RS-485, RS-232, etc.). The circuit 158 may be an interface for connecting to or acting as a universal serial bus (USB) host. The circuit 160 may be a wireless interface for communicating with a user device (e.g., a smart phone, a computer, a tablet computing device, cloud resources, etc.). The circuit 170 may be a microphone for capturing audio. The circuit 172 may be an audio codec for recording audio in a particular format. The circuit 174 may be a speaker for playing audio. In the embodiment shown, the circuits 150-174 are implemented as components external to the camera circuit 90. In some embodiments, the circuits 150-174 may be components on-board the camera circuit 90.

The control interface 116 may be configured to generate signals (e.g., IDC/I2C, STEPPER, IRIS, AF/ZOOM/TILT/PAN, etc.) for controlling the lens and sensor assembly 80. The signal IRIS may be configured to adjust an iris for the lens assembly 80. The interface 116 may enable the camera circuit 90 to control the lens and sensor assembly.

The storage interface 110 may be configured to manage one or more types of storage and/or data access. In one example, the storage interface 110 may implement a direct memory access (DMA) engine and/or a graphics direct memory access (GDMA) engine. In another example, the storage interface 110 may implement a secure digital (SD) card interface (e.g., to connect to the removable media 154). In various embodiments, programming code (e.g., executable instructions for controlling various processors, hardware units, and/or encoders of the camera circuit 90) may be stored in one or more of the memories (e.g., the DDR 150, the NAND 152, etc.). When executed by the processor 100, the programming code generally causes one or more components in the camera circuit 90 to configure video synchronization operations and start video frame processing operations. The video frame processing operations may include tone based non-smooth detection in accordance with embodiments of the invention. A resulting compressed video signal may be presented to the storage interface 110, the video output 130 and/or communication module 140. The storage interface 110 may transfer program code and/or data between external media (e.g., the DDR 150, the NAND 152, removable media 154, etc.) and the local (internal) memory system 112.

The sensor input 114 may be configured to send/receive data to/from the image sensor 84. In one example, the sensor input 114 may comprise an image sensor input interface. The sensor input 114 may be configured to transmit captured images (e.g., light data) from the image sensor 84 to the DSP module 108 and/or the processor 100. The data received by the sensor input 114 may be used by the DSP 108 to determine a luminance (Y) and chrominance (U and V) values from the image sensor 84. The sensor input 114 may provide an interface to the lens and sensor assembly 80. The interface 114 may enable the camera circuit 90 to capture image data from the lens and sensor assembly 80.

The audio interface 118 may be configured to send/receive audio data. In one example, the audio interface 118 may implement an audio inter-IC sound (I²S) interface. The audio interface 118 may be configured to send/receive data in a format implemented by the audio codec 172.

The DSP module 108 may be configured to process digital signals. The DSP module 108 may comprise an image digital signal processor (IDSP), a video digital signal processor DSP (VDSP) and/or an audio digital signal processor (ADSP). The DSP module 108 may be configured to receive information (e.g., pixel data values captured by the image sensor 84) from the sensor input 114. The DSP module 108 may be configured to determine the pixel values (e.g., RGB, YUV, luminance, chrominance, etc.) from the information received from the sensor input 114. The DSP module 108 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering, and sharpening.

The I/O interface 128 may be configured to send/receive data. The data sent/received by the I/O interface 128 may be miscellaneous information and/or control data. In one example, the I/O interface 128 may implement a general purpose input/output (GPIO) interface. In another example, the I/O interface 128 may implement an analog-to-digital converter (ADC) module and/or digital-to-analog converter (DAC) module. In yet another example, the I/O interface 128 may implement an infrared (IR) remote interface. In still another example, the I/O interface 128 may implement one or more synchronous data communications interfaces (IDC SPI/SSI).

The video output module 130 may be configured to send video data. For example, the camera 50 may be connected to an external device (e.g., a TV, a monitor, a laptop computer, a tablet computing device, etc.). The video output module 130 may implement a high-definition multimedia interface (HDMI), an LCD/TV/Parallel interface and/or a DisplayPort interface.

The communication module 140 may be configured to send/receive data. The data sent/received by the communication module 140 may be formatted according to a particular protocol (e.g., Bluetooth, USB, Wi-Fi, UART, etc.). In one example, the communication module 140 may implement a secure digital input output (SDIO) interface. The communication module 140 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20. The communication module 140 may also include support for communicating using one or more of the universal serial bus protocols (e.g., USB 1.0, 2.0, 3.0, etc.). The camera circuit 90 may also be configured to be powered via a USB connection. However, other communication and/or power interfaces may be implemented accordingly to meet the design criteria of a particular application.

Figure 3:
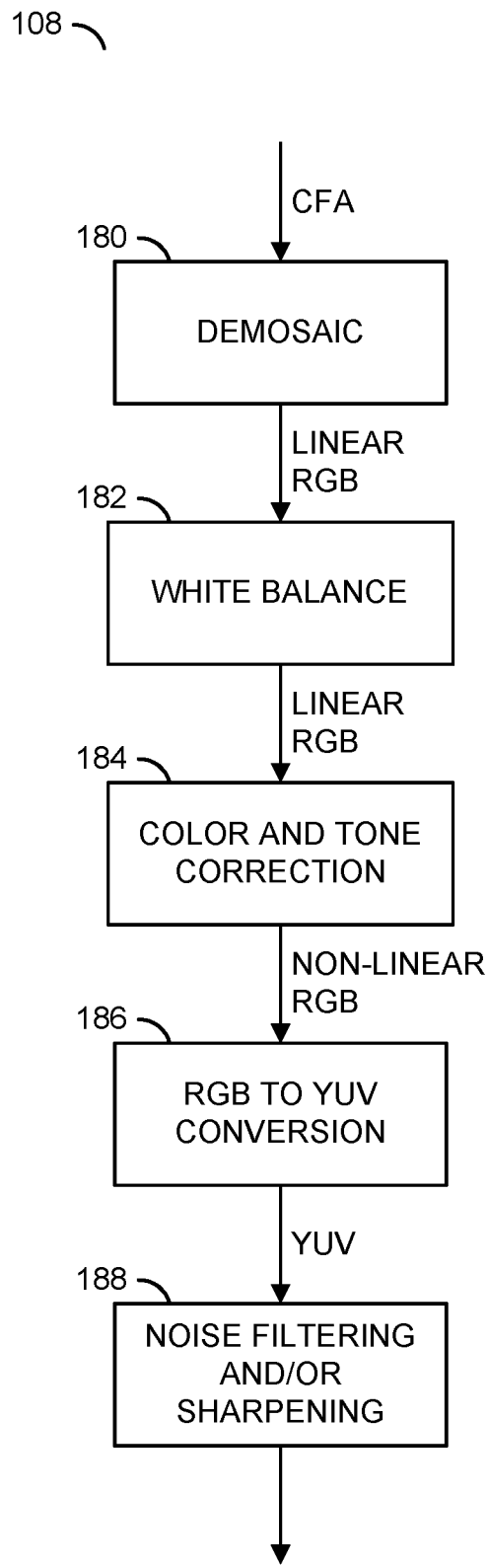
FIG. 3 is a diagram illustrating a number of steps in a digital signal processing pipeline in accordance with an embodiment of the invention.

Referring to FIG. 3, a diagram is shown illustrating a number of steps of an example pipeline of the digital signal processing (DSP) circuit 108 of FIG. 2. In various embodiments, the DSP circuit 108 may implement a pipeline for converting image data acquired from an image sensor in a color filter array (CFA) picture format to a YUV picture format. In various embodiments, the pipeline may comprise a step (or stage) 180, a step (stage) 182, a step (or stage) 184, a step (or stage) 186, and a step (or stage) 188. The step 180 may perform demosaicing on the CFA formatted image data to obtain linear RGB (red, green, blue) image data for each picture element (pixel). The step 182 may perform a white balancing operation. The step 184 may perform color and tone correction. The step 186 may perform RGB to YUV color space conversion. The step 188 may perform noise filtering (e.g., noise reduction, noise correction, etc.) and/or sharpening. The step 188 may implement tone based non-smoothness detection and adjustment in accordance with an embodiment of the invention. The steps 180-186 may use conventional techniques for demosiacing, white balance, color and tone correction, and color space conversion. Noise reduction and/or sharpening need not be limited to the step 188, but may be utilized at one or multiple points in the pipeline steps 180-186.

Noise characteristics vary based on the image data itself and also vary, or are shaped, as the data is processed through the DSP pipeline. Typically, the sensor picture has additive noise (e.g., noise magnitude is independent of the sensor data) and photon noise (e.g., noise due to the discrete nature of photons). The latter increases with brightness. For example, if ideally (e.g., averaged over taking the same picture many times), pixel A would measure 100 photons and pixel B would measure 1,000 photons, more variation (e.g., more noise) would be expected in the absolute number of photons for pixel B compared to pixel A. Hence, a sensor picture will typically have higher noise in brighter pixels.

White balance typically scales (e.g., applies gains to) each of the color channels (e.g., Red, Green and Blue values) by a different amount. The different scaling amounts also scale noise, so colors with higher white balance gains will typically be noisier. For example, if the Red, Green, and Blue gains are 1.5, 1, and 2, respectively, then after white balance Blue may be expected to be the noisiest and Green the cleanest.

Color and tone correction can also affect noise. A tone curve typically has a large slope for dark values and a small slope for bright values; this will increases noise in dark areas compared to bright areas. Because the pixels start out with lower noise in dark areas, typical behavior is that the darkest and brightest areas are lowest in noise and those areas in the middle (e.g., mid-tones) are noisiest. Moreover, color correction, which mixes input RGB, can make some colors noisier than others.

Figure 4:
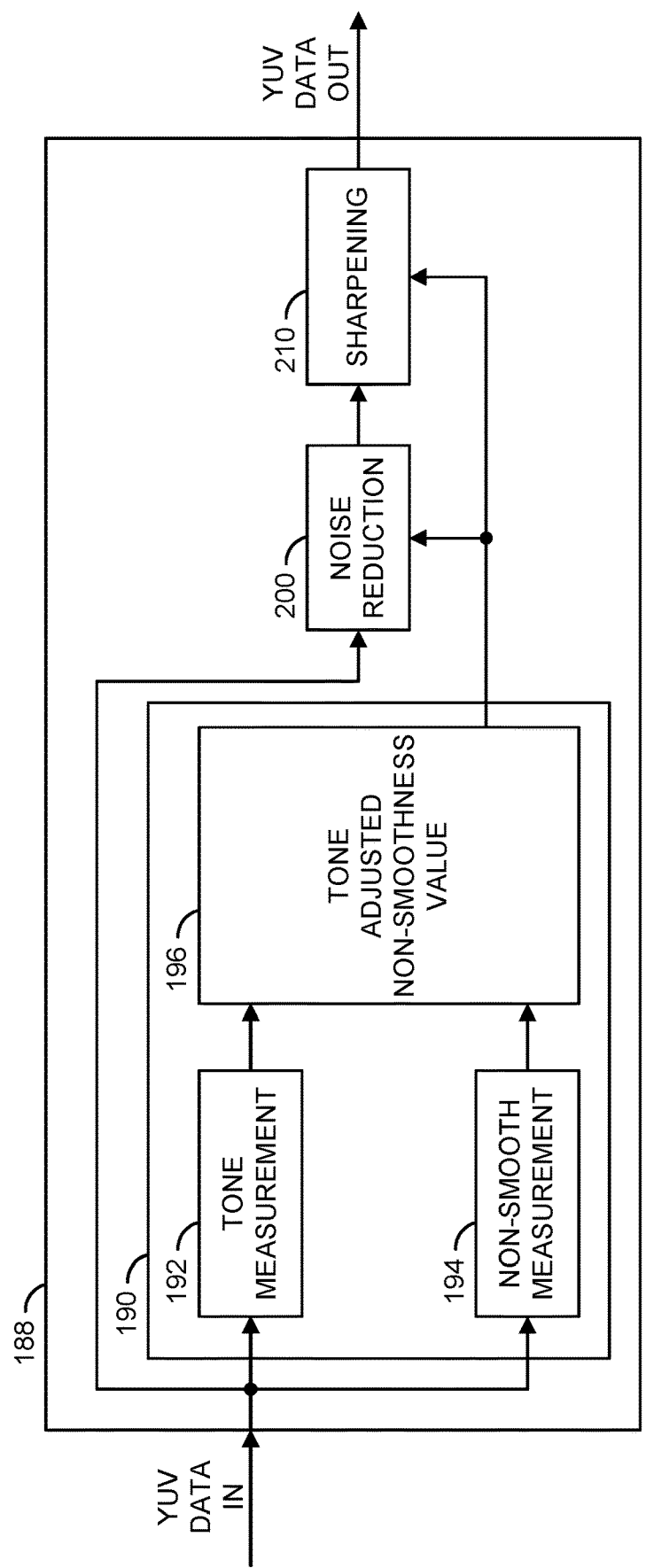
FIG. 4 is a block diagram illustrating an example implementation of tone-based non-smooth detection in accordance with an example embodiment of the invention.

Referring to FIG. 4, a block diagram is shown illustrating an example implementation of tone-based non-smooth detection and adjustment in accordance with an example embodiment of the invention. In various embodiments, the pipeline step 188 of FIG. 3 may include a step (or stage) 190, a step (or stage) 200, and a step (or stage) 210. The step 190 may implement a tone-based non-smooth detection and adjustment process in accordance with an example embodiment of the invention. The step 200 may implement a noise reduction process in accordance with an example embodiment of the invention. The step 210 may implement a picture sharpening process in accordance with an example embodiment of the invention. The steps 190, 200, and 210 may be implemented utilizing either dedicated hardware units or hardware blocks (e.g., state machines) configured (e.g., by the software or firmware 102) to (i) measure non-smoothness, (ii) measure tone, and (iii) combine the non-smoothness and tone measurements to get a tone-adjusted non-smoothness value. In various embodiments, the tone-adjusted non-smoothness value may be used to control image noise reduction and/or sharpening performed in the steps 200 and/or 210.

Higher spatial variation between pixels in an area of a picture indicates that area is non-smooth. So, spatial variation may be used to classify an area of a picture; low variation would indicate the area is smooth, high variation would indicate the area is non-smooth, and medium variation would indicate uncertainty. A limitation of only looking at pixel variation is that while true image features (such as edges or texture) can increase variation, so can noise. Two parts of a picture may have similar measured variation. However, one part may be smooth but noisy, the other part may have texture or edges but be clean. The step 190 generally implements a "non-smooth detector" with improved ability to distinguish between smooth picture noisy areas and non-smooth clean areas.

In various embodiments, the step 190 may comprise a step (or stage) 192, a step (or stage) 194, and a step (or stage) 196. The step 192 generally measures a tone characteristic of an image area and produces a tone value for the area. In various embodiments, the step 192 may take a local average of luminance and chrominance (YUV) values. In some embodiments, the step 192 may take a local average of just the luminance (Y) values. Using the YUV values may be more accurate, but also more complicated. The step 194 generally measures a non-smoothness characteristic of the image area and produces a non-smoothness value for the area. In various embodiments, the step 194 may be implemented as a high pass finite impulse response (FIR) filter followed by an absolute value operation. The step 196 generally adjusts the non-smoothness values generated by the step 194 based upon the tone values generated by the step 192.

In various embodiments, the step 196 may use the tone value from the step 192 to determine either an offset or a multiplier that is then used to adjust the non-smoothness value generated by the step 194. In various embodiments, the offset or multiplier may be computed using a lookup table (LUT). In an example, the lookup table entries may be determined by measuring non-smooth scores in smooth areas of pictures. This process is typically performed by calibrating a camera model (as opposed to being performed for each camera produced of the same model). For example, the camera may take a picture of a standardized grey scale chart and the non-smooth scores measured for smooth areas with different tones. An example standardized gray scale chart may be found at https://www.image-engineering.de/products/charts/all/545-te223). The lookup table would then be programmed by using smaller offsets (e.g., for additive adjustment) or smaller multipliers (e.g., for multiplier adjustments) on tones with higher non-smooth scores. This process may be repeated for different sensor gains and/or different white balance points and/or different color or tone correction methods.

Possible lookup tables may include, but are not limited to the following examples:
1. A 16 entry lookup table may be used on luma values in a 0-255 range, using interpolation.
2. A 256 entry lookup table may be used on luma values in 0-255 (no interpolation needed).
3. A 16×16×16 lookup table may be used on YUV values using Sakamoto interpolation.
4. A 16×16×16 lookup table may be used on YUV values using nearest neighbor.

The adjustment performed in the step 196 is generally done so that the combined effect of noise increasing the measured non-smooth values and adjustment based on the measured tone values results in the adjusted non-smoothness values varying less from tone to tone when compared to the unadjusted non-smoothness values generated by the step 194. The tone based adjustment in accordance with example embodiments of the invention makes smooth/non-smooth detection more robust (as illustrated below).

Figure 5:
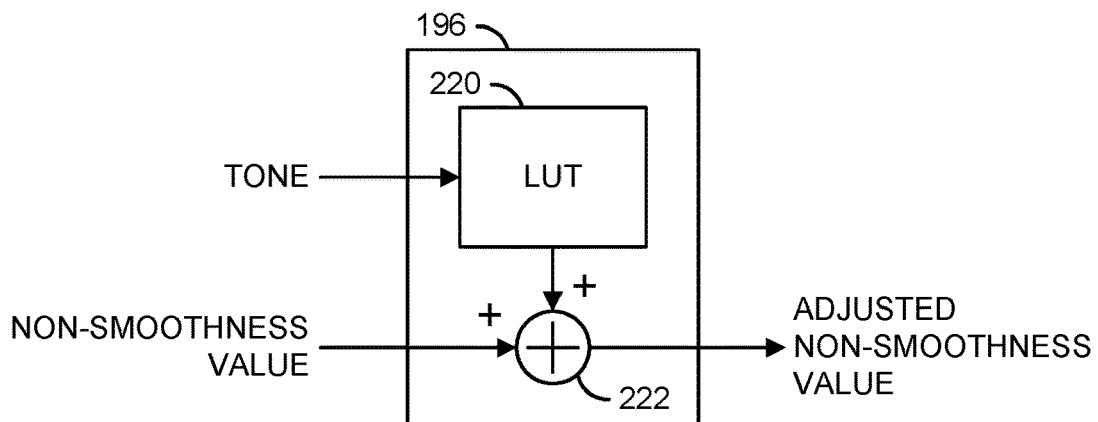
FIG. 5 is a block diagram illustrating a tone based non-smoothness value adjustment circuit in accordance with an example embodiment of the invention.

Referring to FIG. 5, a block diagram is shown illustrating an example implementation of a tone based non-smoothness value adjustment circuit in accordance with an example embodiment of the invention. In an example, the step 196 of the DSP pipeline may be implemented with hardware blocks comprising a lookup table (LUT) 220 and an adder 222. In various embodiments, the tone values determined in the step 192 may be used as an index into the lookup table 220. The lookup table 220 generally contains offset values corresponding to the possible tone values.

The offset values in the lookup table 220 may be determined according to an expected noise model associated with the particular picture, sequence of pictures, and/or imaging system. The offset values may represent an amount of correction at each tone level needed to counteract an effect of the expected noise on smooth/non-smooth detection. In an example, the offset values may be selected to represent a negative version of the expected noise at each tone level (value). The offset selected by the tone value associated with a current non-smoothness value is added to the non-smoothness value using the adder 222 to produce an adjusted non-smoothness value. The adjusted non-smoothness value may be communicated to the steps 200 and 210 to control the noise reduction and/or sharpening operations, respectively.

Figure 6:
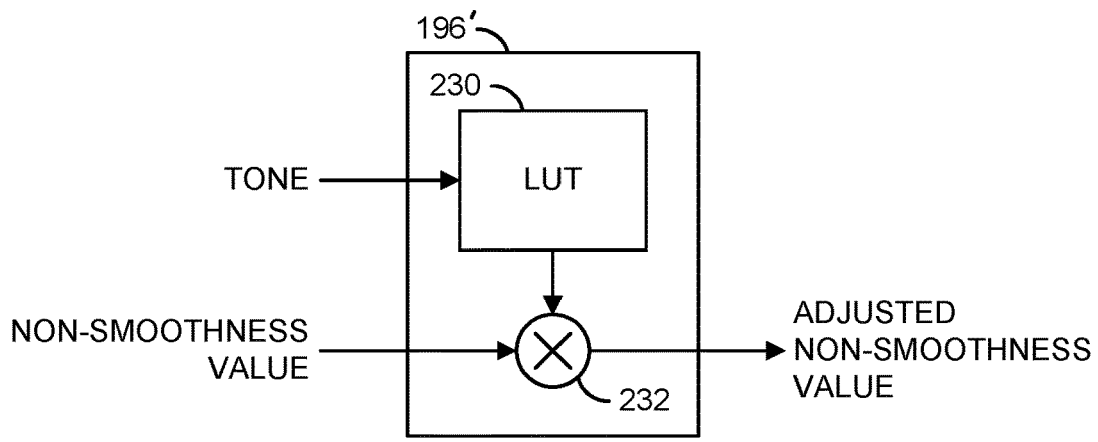
FIG. 6 is a block diagram illustrating another tone based non-smoothness value adjustment circuit in accordance with an example embodiment of the invention.

Referring to FIG. 6, a block diagram is shown illustrating another example implementation of a tone based non-smoothness value adjustment circuit in accordance with an example embodiment of the invention. In an example, an alternative step 196' of the DSP pipeline may be implemented with hardware blocks comprising a lookup table (LUT) 230 and a multiplier circuit 232. In various embodiments, the tone values determined in the step 192 may be used as an index into the lookup table 230. The lookup table 230 generally contains multiplier values corresponding to the possible tone values.

The multiplier values in the lookup table 230 may be determined according to an expected noise model associated with the particular picture, sequence of pictures, and/or imaging system. The multiplier values may represent an amount of correction at each tone level needed to counteract an effect of the expected noise on smooth/non-smooth detection. In an example, the multiplier values may be selected to represent a negative version of the expected noise at each tone level (value). The current unadjusted non-smoothness value is multiplied by a particular multiplier value selected from the lookup table by the tone value associated with the unadjusted non-smoothness value using the multiplier circuit 232 to produce an adjusted non-smoothness value. The adjusted non-smoothness value may be communicated to the steps 200 and 210 to control the noise reduction and sharpening operations, respectively.

Figure 7:
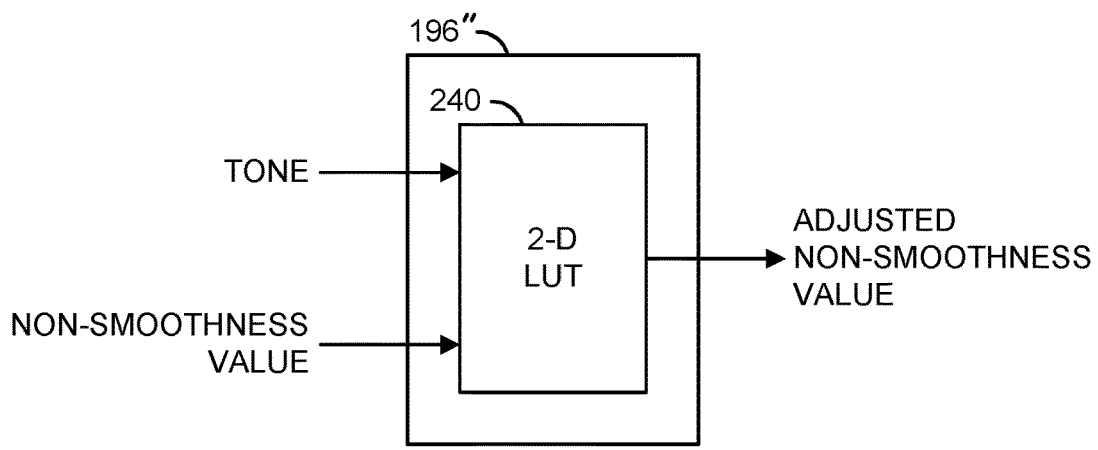
FIG. 7 is a block diagram illustrating yet another tone based non-smoothness value adjustment circuit in accordance with an example embodiment of the invention.

Referring to FIG. 7, a block diagram is shown illustrating yet another example implementation of a tone based non-smoothness value adjustment circuit in accordance with an example embodiment of the invention. In an example, an alternative step 196" of the DSP pipeline may be implemented with hardware blocks implementing a 2-D lookup table 240. In various embodiments, the tone values determined in the step 192 and the non-smoothness values determined in the step 194 may be used as indices into the lookup table 240. The lookup table 240 generally contains the various adjusted non-smoothness values corresponding to the combinations of possible unadjusted non-smoothness values and possible tone values.

The combinations of unadjusted non-smoothness values and tone values contained in the lookup table 240 may be determined according to an expected noise model associated with the particular picture, sequence of pictures, and/or imaging system. The adjusted non-smoothness values generally account for an amount of correction at each tone level needed to counteract an effect of the expected noise on smooth/non-smooth detection. In various embodiments, the lookup table 240 may be programmed to implement the adjustment schemes described above in connection with FIG. 5 or FIG. 6, and may make sense when 2-D or higher dimension lookup hardware is available. The adjusted non-smoothness value output by the lookup table 240 may be communicated to the steps 200 and 210 to control the noise reduction and sharpening operations, respectively.

A numerical example may be used to illustrate how level adjusting may be used to improve smooth/non-smooth detection. The following illustration uses an embodiment where four tone values (e.g, 1-4) and four correction offsets (e.g., 70, 60, 40, and 0) are implemented for adjustment (correction) of the non-smoothness values determined in the step 194. In various embodiments, the correction amount is generally selected as a complement of the expected noise for the associated tone. For example, tone 1 is expected to be the cleanest (e.g., have the least noise) and, therefore, has the highest correction value. Tone 4 is expected to be the noisiest and, therefore, has the lowest correction value. An example operation of the step 196 is illustrated in the following Table 1:

TABLE 1

| TONE | CORRECTION AMOUNT | EXAMPLE UNCORRECTED AMOUNT | EXAMPLE CORRECTED AMOUNT |
|---|---|---|---|
| Smooth areas | | | |
| 1 | 70 | 8 | 78 |
| 2 | 60 | 22 | 82 |
| 3 | 40 | 36 | 76 |
| 4 | 0 | 85 | 85 |
| Non-smooth areas | | | |
| 1 | 70 | 35 | 105 |
| 2 | 60 | 29 | 89 |
| 3 | 40 | 100 | 140 |
| 4 | 0 | 120 | 120 |

Even if the amounts for each tone cannot be predicted exactly, using a correction amount that is good for a typical amount for the tone involved can make discriminating between smooth and non-smooth areas much more robust.

In the above example, as the tone value increase (e.g., from 1→2→3→4), the noise is expected to be higher and so the average uncorrected non-smoothness amount increases. As the average uncorrected non-smoothness amount increases, smaller correction offsets are used.

In the above example, the correction is not exact (which is typical). For example, the smooth area case with tone 4 has a higher corrected amount than the other smooth area cases. This can occur when either the correction is somewhat off for typical values (e.g., tone 4 really should have a smaller offset) and/or when the noise just happens to be higher in the particular instance (e.g., if another picture were taken under identical conditions the non-smoothness amount would be lower).

Referring back to Table 1, the non-smooth area having a tone of 2 has an uncorrected non-smoothness amount, 29, that, for the noise level, is not that high, and, therefore, the corrected amount, 89, is almost as low as the smooth area with tone 2. This can occur when, for example, there is some very low amplitude texture.

In an example, classification rules for smooth and non-smooth corrected amounts may be implemented as follows:

Example A

Corrected amounts<=86 are considered smooth;
Corrected amounts>=88 are considered non-smooth;
Corrected amounts in-between 86 and 88 are interpolated.
Using the decision rules of Example A, all 8 examples in Table 1 are classified correctly.

In another example, classification rules for smooth and non-smooth corrected amounts may be implemented as follows:

Example B

Corrected amount<=86 are considered smooth;
Corrected amount>=90 are considered non-smooth;
Corrected amounts in between 86 and 90 are interpolated.
Using the decision rules of Example B, the corrected non-smooth area amount associated with tone 2, 89, would need to be interpolated (e.g., classified as "75% non-smooth"). Since the non-smooth area amount associated with tone 2 is actually non-smooth, the result of using the decision rules of Example B would be somewhat worse than a perfect classification.

In still another example, classification rules for smooth and non-smooth corrected amounts may be implemented as follows:

Example C

Corrected amount<=82 are considered smooth;
Corrected amount>=85 are considered non-smooth;
Corrected amounts in-between 82 and 85 are interpolated.
Using the decision rules of Example C, the corrected amount associated with the smooth area having tone level 4, 85, would be judged 100% non-smooth. Since the area associated with the corrected amount of 85 is associated with a smooth area having a tone level of 2, the result of using the decision rules of Example C would be 100% wrong. The meaning of the terminology x % non-smooth will is further explained below.

In another example, instead of the entry shown above in Table 1, the smooth area case with tone value 3 happens to be particularly noisy with an uncorrected non-smoothness amount of 50 and a corrected non-smoothness amount of 90.

Since 90 is higher than one of the corrected non-smoothness amounts for the non-smooth areas, no decision rules on tone based corrected non-smoothness values would be correct in all 8 cases. Once again, although using tone corrected non-smoothness values may not be perfect, tone corrected non-smoothness values will do a better job of classifying picture areas than the uncorrected amounts. Indeed, referring to Table 1 above, it is clear that any rule on the uncorrected amounts will give poor results.

When the adjusted (corrected) non-smoothness values have been determined in the step 190, the adjusted (corrected) non-smoothness values may be used in the subsequent picture processing portions of the DSP pipeline (e.g., steps 200 and 210). In the step 200 (e.g., luminance and or chrominance noise reduction), if the adjusted non-smoothness value is low, increased noise reduction may be applied. The increased noise reduction may include, but is not limited to, the following examples:

1. Compute a filtered amount, and take a weighted average of pre- and post-filtered amounts, where the weight depends on the adjusted non-smoothness value.
2. Compute a filtered amount, and take a weighted average of pre- and post-filtered amounts, where the weight depends on the adjusted non-smoothness value, except other factors may influence the weight. For example, the difference between filtered and unfiltered amounts could be used, and use both a less higher weight for the filtered amount based on a smaller difference and also based on a lower adjusted non-smoothness value.
3. Compute a filtered amount, but limit the change to the filtered amount based on the adjusted non-smoothness value. For sharpening reduction (luminance).

In the step 210 (e.g., sharpening), if the adjusted non-smoothness value is high, increased sharpening may be applied. The increased sharpening may include, but is not limited to, the following examples:

1. Linearly scale sharpening amount based on the adjusted non-smoothness value computed in the step 190.
2. Linearly scale sharpening amount based on the adjusted non-smoothness value computed in the step 190, but allow other factors to influence the scale factor as well. For example, look at the unscaled sharpening amount (e.g., sharpening FIR out), and use both the unscaled sharpening amount (e.g., bigger→bigger scale factor) and the adjusted non-smoothness value (e.g., higher→bigger scale factor).
3. Limit sharpening changes based on the adjusted non-smoothness value (e.g., the higher the adjusted non-smoothness value, the higher the maximum changed amount).

Using the above example, application of the adjusted non-smoothness value in ways that depend on "soft" classification may be shown. For example, areas may be classified not just as smooth or non-smooth, but fractionally in-between. In the noise reduction Example 1 above, the fraction of the pre-filtered amount could be the fraction (e.g., x %) non-smooth. For example:

0% non-smooth means use the filtered amount only;
 25% non-smooth means use 25% pre-filtered and 75% filtered amounts;
 100% non-smooth means use the pre-filtered amount only.

In the noise reduction Example 3 above, the change amount could be (1 minus the non-smooth fraction)*10 rounded to the nearest integer. For example:

0% non-smooth means a change of up to 10;
 70% non-smooth means a change of up to 3;
 100% non-smooth means no change (e.g., only use pre-filtered amounts).

The two previous examples illustrate rules that control some parameter (e.g., fraction filtered, max change amount) as varying linearly with respect to the non-smooth amount. However, the variation need not be linear. For example, in the sharpening Example 3 above the following rules could be applied:

0%<=non-smooth amount<30% means max change of 2;
 30%<=non-smooth amount<70% means max change of 4;
 70%<=non-smooth amount<100% means max change of 6;
 100% non-smooth means max change of 10.

Figure 8:
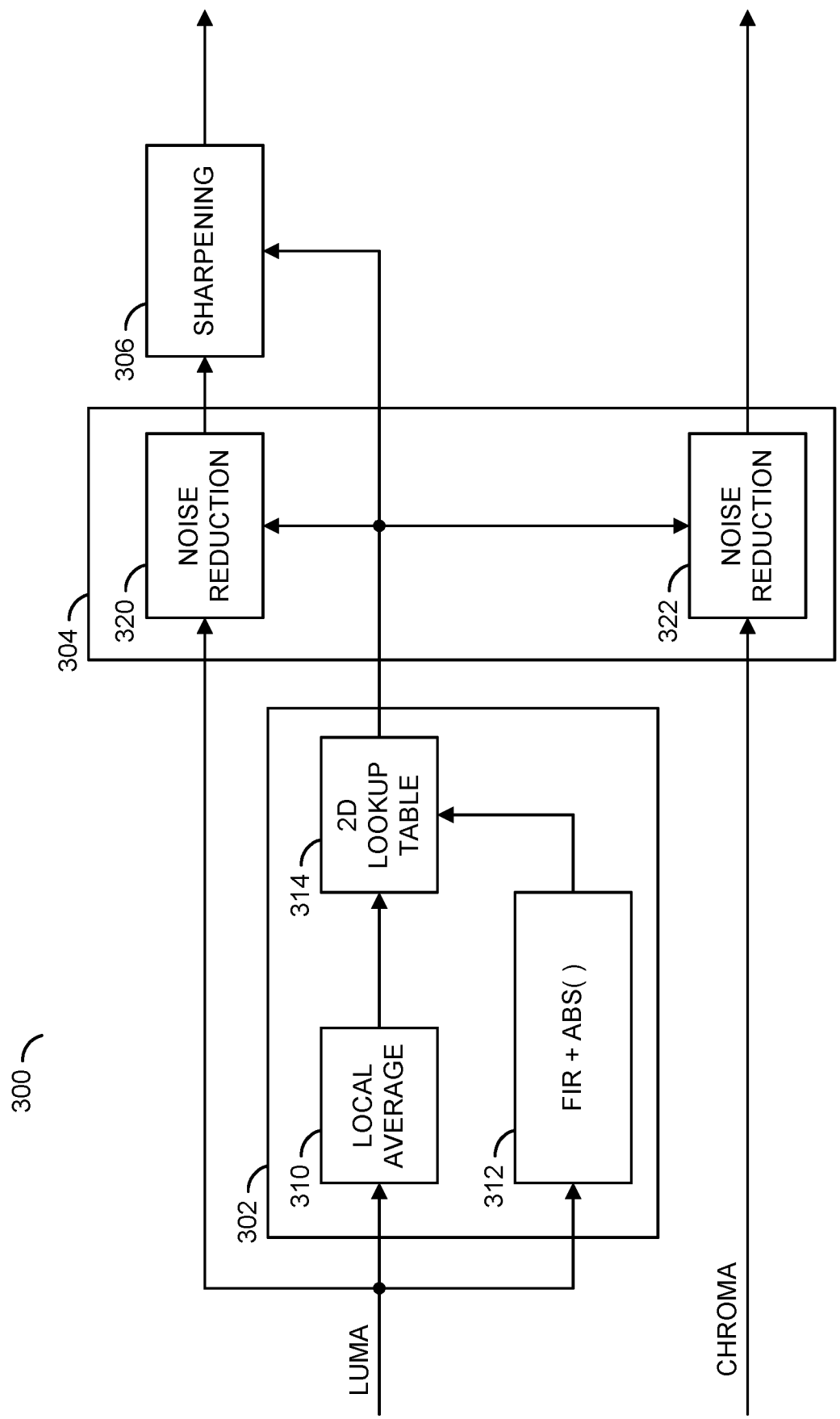
FIG. 8 is a diagram illustrating a number of processing blocks configured to perform a tone based non-smoothness value adjustment in accordance with an example embodiment of the invention.

Referring to FIG. 8, a diagram is shown illustrating a number of processing blocks configured to perform a tone based non-smoothness value adjustment in accordance with an example embodiment of the invention. In an example, an adjusted non-smoothness amount may be computed once and used for luminance noise reduction, chrominance noise reduction, and sharpening. In general, a tone based non-smoothness value adjustment process in accordance with an example embodiment of the invention is not limited to a processor having hardware specifically designed to perform tone-based non-smooth detection. In an example embodiment, hardware blocks of a processor may be programmed (e.g., retasked) to accomplish portions of a tone based non-smoothness value adjustment process in accordance with an example embodiment of the invention.

In an example, a processor 300 may include a number of hardware blocks (or circuits) that may be configured (programmed) to perform individual steps of a tone based non-smoothness value adjustment process during a first number of passes and other image processing operations during another number of passes. In an example, the processor 300 may be configured to operate on luminance and chrominance data separately. In an example, hardware blocks of the processor 300 may be configured to operate as a block (or circuit) 302, a block (or circuit) 304, and a block (or circuit) 306. The blocks 302, 304, and 306 may represent different passes of data through the processor 300.

The block 302 may generate adjusted non-smoothness values for areas of an image in response to luminance data of the areas. The block 304 may perform noise reduction on luminance and chrominance data based on the adjusted non-smoothness values generated by the block 302. The block 306 may perform sharpening on luminance data based on the adjusted non-smoothness values generated by the block 302.

In an example, the block 302 may comprise a block (or circuit) 310, a block (or circuit) 312, and a block (or circuit) 314. The circuit 310 may be configured to compute tone as a local average of the luma input data. In an example embodiment, the circuit 310 may be implemented using a polyphase re-sampler programmed just to take a weighted local average (e.g., blur) of the input data. The circuit 312 may be configured to implement the non-smoothness determination as a high pass finite impulse response (FIR) filter followed by an absolute value. In an example embodiment, the circuit 312 may be implemented using a hardware unit or units usually configured to do sharpening or noise reduction, except that instead of programming the circuit 312 to enhance high frequencies (as in sharpening) the circuit 312 may be programmed (configured) to extract high frequencies and then take the absolute value (e.g., each output is high or low if there is a lot or a little high frequency content, respectively).

The circuit 314 may be configured to provide a 2-D lookup table. The 2_D lookup may be programmed to provide the effect of a 1-D lookup plus an addition or a multiplication. In an example embodiment, the circuit 314 may be implemented using color correction hardware of the processor 300. In an example, the color correction hardware may perform a 3-D lookup, mapping input YUV to output YUV (e.g., using a 16×16×16 table). In an example, the color correction hardware may be programmed so that the output equals lookup(input 2)+input 1 clamped to <=1023 (e.g., for 10 bit YUV). A third input of the 3-D lookup table may be ignored. When hardware is available that can control luminance processing based on chrominance and chrominance processing based on luminance, that hardware may be use to implement the blocks 320, 306, and 322. When used in this manner, the hardware blocks are not actually controlling luminance processing based on chrominance and chrominance processing based on luminance. Instead, the tone value may be presented to a luminance input port and the smoothed luminance may be presented to a chrominance input port.

The circuits 304 and 306 provide noise reduction and sharpening, respectively. In an example, luminance noise reduction and sharpening may depend on chrominance and chrominance noise reduction may depend on luminance. In an example implementation, the adjusted (corrected) non-smoothness score generated by the circuit 302 may be fed into a chrominance port for luminance noise reduction and sharpening, and into a luminance port for chrominance noise reduction. This allows the adjusted (corrected) non-smoothness score to control luminance noise reduction and sharpening, and chrominance noise reduction as well.

In some embodiments, the hardware blocks of the processor 300 may be more accurately described as state machines. In general, there is no software that can be programmed to process instructions for each sample. Programming as used in connection with the processor 300 generally refers to setting up some registers to determine how the hardware units work. There may be software that does the configuring of the hardware units. Such software would typically run before a picture is processed. For example:

1. As mentioned above, the color correction hardware may have a 16×16×16 table, and "programming" just means setting all the values of the table;
2. In the sharpening hardware, there may be control bits for what gets added to the final output.

In some embodiments, the hardware may be reused in sequence. In an example, image processing on the processor 300 may use multiple passes, so that even if each hardware block can process only one pixel per clock, the picture may be run through the hardware multiple times and the total run time may be multiple clocks (e.g., ~3-4 clock/pixel). The tone based non-smooth detection may be added using "existing" hardware, but in additional passes, making the run time somewhat longer.

Figure 9:
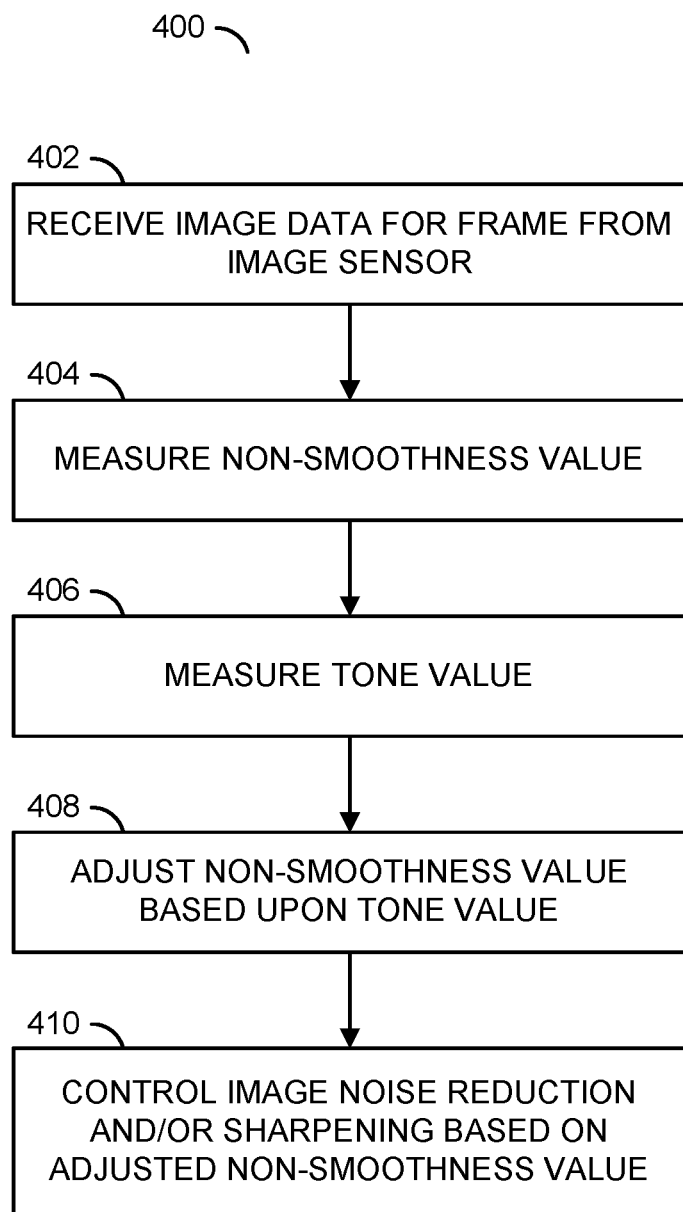
FIG. 9 is a flow diagram illustrating a process in accordance with an example embodiment of the invention.

Referring to FIG. 9, a flow diagram is shown illustrating a tone based non-smoothness value adjustment process 400 in accordance with an example embodiment of the invention. In various embodiments, the process (or method) 400 may comprise a step (or state) 402, a step (or state) 404, a step (or state) 406, a step (or state) 408, and a step (or state) 410. In the step 402, the process 400 may receive image data for a frame from an image sensor. In an example, the image data may be in YUV format after having been passed through a number of stages of a CFA to YUV pipeline. In the step 404, the process 400 measures (computes) non-smoothness values for areas of the image. In the step 406, the process 400 measures (computes) tone values for the areas of the image.

In various embodiments, the non-smoothness and tone values are measured (computed) using the both luminance and chrominance (YUV) data for each pixel. In some embodiments, the smoothness and tone values are measured (computed) using only luminance (Y) of each pixel. In the step 408, the process 400 adjusts each of the non-smoothness values (e.g., for expected noise levels) based on the tone value corresponding to the same area. In various embodiments, the step 408 may utilize a 1-D lookup table to determined offsets or multipliers for adjusting the non-smoothness values with an adder or multiplier, respectively. In some embodiments, the step 408 may utilize 2-D, 3-D, or higher dimensional lookup hardware to perform a 2-D lookup programmed to provide the effect of a 1-D lookup plus an addition or multiplication. In the step 410, the process 400 uses the adjusted non-smoothness values to control one or more image processing operations (e.g., noise reduction and/or sharpening).

The functions illustrated by the diagrams of FIGS. 1-9 may be implemented and/or modeled using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A method of processing an image in a raw image pipeline to improve an ability of a processor to distinguish between smooth picture noisy areas and non-smooth clean areas, the method comprising the steps of:
   (A) using a first hardware circuit of said processor to measure a non-smoothness characteristic for at least one area comprising a plurality of pixels of said image and compute a non-smoothness value for the at least one area of said image;
   (B) using a second hardware circuit of said processor to measure a pixel value for each of the pixels of the at least one area of said image and compute a local average value for the at least one area of said image based on the measured pixel values for the pixels of the at least one area of said image;
   (C) using a third hardware circuit of said processor to compute an adjusted non-smoothness value for the at least one area by adjusting said non-smoothness value for the at least one area of said image based on said local average value for the at least one area of said image; and
   (D) using said processor to perform one or more of noise reduction filtering or sharpening filtering on the at least one area of said image in said raw image pipeline based on said adjusted non-smoothness value.

2. The method according to claim 1, wherein said adjusted non-smoothness value is adjusted according to an expected noise level associated with said local average value.

3. The method according to claim 1, wherein said noise reduction becomes stronger as said adjusted non-smoothness value is lower.

4. The method according to claim 1, wherein said sharpening is stronger when said adjusted non-smoothness value is higher.

5. The method according to claim 1, wherein said local average value comprises an average luma value of said area.

6. The method according to claim 1, wherein said local average value is computed using luminance and chrominance values of said pixels of said area.

7. The method according to claim 1, wherein computing said adjusted non-smoothness value for the at least one area comprises adding an offset selected based on said local average value for the at least one area of said image to the computed non-smoothness value for the at least one area.

8. The method according to claim 1, wherein computing said adjusted non-smoothness value for the at least one area comprises multiplying the computed non-smoothness value for the at least one area by a multiplier selected based on said local average value for the at least one area of said image.

9. The method according to claim 1, wherein computing said adjusted non-smoothness value for the at least one area comprises selecting values from a lookup table based on at least one of said local average value for the at least one area of said image and the computed non-smoothness value for the at least one area.

10. An apparatus comprising:
    a sensor input interface circuit configured to receive data of an image from an image sensor; and
    a processor comprising a digital signal processing pipeline configured to (i) distinguish between smooth picture noisy areas and non-smooth clean areas of said image by performing tone based non-smooth detection to obtain an adjusted non-smoothness value for at least one area comprising a plurality of pixels of said image using said data of said image and (ii) adjust one or more of noise reduction filtering or sharpening filtering performed on said at least one area of said image in a raw image pipeline based on said adjusted non-smoothness value obtained from said tone based non-smooth detection.

11. The apparatus according to claim 10, wherein said noise reduction is stronger when said adjusted non-smoothness value is lower.

12. The apparatus according to claim 10, wherein said sharpening is stronger when said adjusted non-smoothness value is higher.

13. The apparatus according to claim 10, wherein said tone based non-smooth detection is implemented using one or more hardware circuits of said processor configured to (i) measure a non-smoothness characteristic for at least one area of said image and compute a non-smoothness value for the at least one area of said image, (ii) measure a pixel value for each of the pixels of the at least one area of said image and compute a local average value for the pixels of the at least one area of said image, (iii) compute an adjusted non-smoothness value for the at least one area by adjusting said non-smoothness value for the at least one area of said image based on said local average value for the at least one area of said image, and (iv) perform said one or more of noise reduction filtering or sharpening filtering on the at least one area of said image based on said adjusted non-smoothness value.

14. The apparatus of claim 13, wherein said local average value comprises an average luminance value for the plurality of pixels of said area.

15. The apparatus according claim 13, wherein said local average value is computed using luminance and chrominance values for the plurality of pixels of said area.

16. The apparatus according to claim 13, wherein computing said adjusted non-smoothness value for the at least one area comprises adding an offset selected from a lookup table based on said local average value for the at least one area of said image to the computed non-smoothness value for the at least one area.

17. The apparatus according to claim 13, wherein computing said adjusted non-smoothness value for the at least one area comprises multiplying the computed non-smoothness value for the at least one area by a multiplier selected from a lookup table based on said local average value for the at least one area of said image.

18. The apparatus according to claim 13, wherein computing said adjusted non-smoothness value for the at least one area comprises selecting values from a lookup table based on at least one of said local average value and the computed non-smoothness value for the at least one area.

* * * * *